United States Patent [19]

Vassiliou

[11] Patent Number: 5,340,601
[45] Date of Patent: Aug. 23, 1994

[54] SIMULATED EGG-YOLK COMPOSITIONS, PRODUCTS, AND METHODS OF MAKING

[76] Inventor: Eustathios Vassiliou, 12 S. Townview La., Newark, Del. 19711

[21] Appl. No.: 104,709

[22] Filed: Aug. 11, 1993

Related U.S. Application Data

[63] Continuation-in-part of Ser. No. 75,106, Jun. 11, 1993, which is a continuation-in-part of Ser. No. 930,105, Aug. 14, 1992, Pat. No. 5,227,189, which is a continuation-in-part of Ser. No. 750,116, Aug. 19, 1991, Pat. No. 5,151,293, which is a continuation-in-part of Ser. No. 551,160, Jul. 11, 1990, Pat. No. 5,0763,399.

[51] Int. Cl.$^5$ ............................................. A23L 1/32
[52] U.S. Cl. .................................. 426/614; 426/104; 426/106; 426/250; 426/517; 426/518; 426/520; 426/580
[58] Field of Search ............... 426/614, 580, 250, 517, 426/518, 520, 104, 106

[56] References Cited

U.S. PATENT DOCUMENTS

| | | | |
|---|---|---|---|
| 2,766,126 | 10/1956 | Hawk | 426/614 |
| 3,510,315 | 5/1970 | Hawley | 99/113 |
| 3,640,732 | 2/1972 | Johnson | 99/114 |
| 3,804,951 | 4/1974 | Rapp | 426/167 |
| 3,843,825 | 10/1974 | Hawley | 426/393 |
| 3,864,500 | 2/1975 | Lynn | 426/195 |
| 3,911,144 | 10/1975 | Strong | 426/588 |
| 3,941,892 | 3/1976 | Glasser et al. | 426/104 |
| 3,987,212 | 10/1976 | Seeley et al. | 426/614 |
| 4,046,922 | 9/1977 | Burkwall, Jr. | 426/104 |
| 4,103,038 | 7/1978 | Roberts | 426/601 |
| 4,103,040 | 7/1978 | Fioriti et al. | 426/614 |
| 4,296,134 | 10/1981 | Boldt | 426/250 |
| 4,362,761 | 12/1982 | Chans et al. | 426/614 |
| 4,409,249 | 10/1983 | Forkner | 426/100 |
| 4,469,708 | 9/1984 | Rapp | 426/103 |
| 5,073,399 | 12/1991 | Vassiliou | 426/614 |
| 5,149,561 | 9/1992 | Vassiliou | 426/614 |
| 5,151,293 | 9/1992 | Vassiliou | 426/614 |
| 5,192,566 | 3/1993 | Cox et al. | 426/89 |

FOREIGN PATENT DOCUMENTS

| | | | |
|---|---|---|---|
| 2534426 | 1/1975 | Fed. Rep. of Germany | 426/614 |
| 0237965 | 11/1985 | Japan | 426/614 |
| 3044849 | 2/1988 | Japan | 426/614 |

*Primary Examiner*—Helen Pratt
*Attorney, Agent, or Firm*—E. Vassiliou

[57] ABSTRACT

A simulated hard cooked egg-yolk composition, shaped egg-yolks, eggs comprising such egg-yolks, as well as methods for making the same, by utilizing colored pureed egg-white, of preferably increased solids, along with a grain preserving agent. This invention also encompasses food products containing one or more of the above simulated entities.

52 Claims, No Drawings

SIMULATED EGG-YOLK COMPOSITIONS, PRODUCTS, AND METHODS OF MAKING

This Application is a continuation-in-part of application Ser. No. 08/075,106, filed on Jun. 11, 1993, which is a continuation-in-part of application Ser. No. 07/930,105 filed on Aug. 14, 1992, now U.S. Pat. No. 5,227,189, which is a continuation-in-part of application Ser. No. 07/750,116, filed on Aug. 26, 1991, now U.S. Pat. No. 5,151,293, which is a continuation-in-part of application Ser. No. 07/551,160 filed on Jul. 11, 1990, now U.S. Pat. No. 5,073,399, all of which are incorporated herein by reference.

FIELD OF THE INVENTION

This invention relates to simulated egg-yolk compositions, preferably cholesterol free compositions, egg products, and methods of making them. More particularly, the simulated yolk compositions have a mouthfeel, taste, and consistency of real hard-boiled egg-yolks.

BACKGROUND OF THE INVENTION

Although the egg represents an outstanding nutritional food, and a food that people enjoy eating, especially as part of the breakfast in the morning, the fact that it is one of the richest foods in cholesterol and saturated fats has forced an enormous number of people to avoid consuming eggs.

A large number of solutions have been proposed to answer this problem, some more and some less successful.

A highly compromised solution, which has been found commercially attractive, has been the one according to which the egg yolk is removed and substituted usually by the equivalent amount of egg white, which may also be simulated with a yellow-orange food-colorant and small quantities of other adjuncts improving desired properties of the simulated egg. Since this type of simulated egg has the consistency and appearance of mixed egg-whites with egg-yolks, it can only be used as "scrambled eggs", or omelette, or more generally in cooking recipes requiring mixed egg-yolks with egg-whites. This is a serious draw-back because it does not provide people with the option to have a cholesterol-free fried or a poached egg having an egg-yolk in a separate phase from the white. An egg with the yolk in a separate phase from the white is highly desirable to a large number of people.

Liquid egg-products without a separate phase of the yolk from the white are the subject of a number of U.S. Patents. Representative ones, among others, are U.S. Pat. Nos. 3,911,144, 3,987,212, 4,103,038, and 4,296,134.

U.S. Pat. No. 3,804,951 describes an egg-extender composition consisting essentially of an interrupted aqueous gel product containing kappa-carrageenan, xanthan gum, locust gum, and potassium citrate and water.

A method of preparing an egg-yolk substitute and resulting products from its use is described in U.S. Pat. No. 3,864,500. The invention of this patent is directed mainly to the addition of the resulting egg-yolk in recipes of products such as cakes, cookies, and the like, so that shaping and preserving the yolk in liquid egg-white is not important.

U.S. Pat. Nos. 5,073,399, 5,149,561, and 5,151,293, all three of which are incorporated herein by reference, describe simulated eggs having the yolk and the egg-white together but in separate phases. The yolks of these eggs are non-flowable at room temperature, but they liquify at cooking temperatures and remain flowable at serving temperatures for consumption, in the form of "sunny-side-up" or "over-easy" versions.

U.S. Pat. No. 5,192,566 also discloses a whole egg analogue wherein the yolk analogue is treated to form a membrane on its outer surface. The yolk analogue with its attendant membrane is combined with natural egg white, treated egg white, or an egg white analogue to form the whole egg analogue.

U.S. Pat. No. 3,510,315 describes a solid prepared egg product, wherein a cooked real egg-yolk containing a proteolytic enzyme is surrounded with cooked egg-white containing a water binding material.

U.S. Pat. No 3,640,732 describes a simulated cooked egg approximating a boiled, poached or fried hen's egg, wherein the yolk may contain water, vegetable oil, protein, a gel former with a setting agent, and colorant, while the white portion contains similar ingredients without the colorant.

U.S. Pat. No. 3,843,825 provides a method for making a product resembling a hard boiled egg cut in half with the yolk removed, by appropriately molding and coagulating egg-white.

U.S. Pat. No. 4,046,922 discloses a shelf-stable cooked, simulated egg comprising specified amounts of egg-solids, edible water absorbing hydrocolloid, a high protein binding agent, water, and either sugar, sugar equivalents, or mixtures thereof.

U.S. Pat. No. 3,941,892 discloses an egg product made by molding a low cholesterol egg-yolk portion of critical formulation together with an egg-white portion, and subjecting the egg to freezing. In the preferred embodiment, the mold employed in forming the egg product is employed as the package.

U.S. Pat. No. 4,103,040 discloses a wet egg-yolk which is combined with edible oil by high energy, high shear mixing, so that the cholesterol is extracted by the oil from the egg-yolk. At the same time the ratio of the polyunsaturated fats to the saturated fats increases. The yolk, after separation from the oil can become a constituent of various egg-products.

U.S. Pat. No. 4,409,249 describes a method according to which high energy agitation is applied to coagulated and uncoagulated egg-white portion to form a homogeneous, aerated egg white dispersion. The egg-white dispersion is then assembled with processed egg-yolk and the assembly is frozen.

SUMMARY OF THE INVENTION

In the present state of art regarding simulated eggs, the major effort has been concentrated in formulating yolks, whites, and combinations thereof, mainly in an uncooked form.

None of the references discussed above have addressed the intricacy of making a simulated yolk having the most difficult to attain characteristics of a real hard cooked egg-yolk, primarily including the very special mouthfeel, which could be roughly characterized as grainy, but which actually is not exactly grainy, or which could be roughly characterized as pasty, and which actually is not exactly pasty, but which mouthfeel might be better characterized as one giving an initial soft-grain sensation to the mouth which gradually ends to a pasty perception; and the special structure, which is easy to crumble into pieces with a small pressure, and which at the same time allows easy reshaping, also by the application of a small pressure.

In contrast to other attempts, the present invention has resolved satisfactorily this vexing problem. It has now been discovered by the applicant that a simulated egg-yolk may be made to give an excellent impression and resemblance to a real hard-boiled egg-yolk in image, taste, mouthfeel and in general behavior.

Thus, the instant invention is directed to a simulated hard cooked egg-yolk composition, to shaped egg-yolks, to eggs comprising such egg-yolks, to methods for making the same, as well as to packages containing these entities, by utilizing colored pureed egg-white, of preferably increased solids, along with a grain preserving agent, as described in detail hereinwith. The instant invention, also pertains to food products containing one or more of these simulated entities, such as for example egg-salad, deviled eggs, cakes, and the like.

According to this invention, a simulated hard-cooked egg-yolk composition is provided, comprising
  (a) a colorant,
  (b) pureed thermally-coagulated egg-white, and
  (c) a grain preserving agent;
    with the requirement that the composition is enriched in solids and has a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

Also, according to this invention, there is provided a simulated shaped egg-yolk having the above composition, and a simulated egg product comprising egg-white combined with said simulated egg-yolk in separate phases. The egg-white may be raw egg-white or cooked egg-white.

In addition, this invention includes a method of making a simulated egg-yolk composition comprising the steps of:
  adding a colorant to egg-whites, the egg-whites selected from the group consisting of natural egg-white and natural egg-white containing additional albumin;
  coagulating the egg-whites thermally;
  optionally freezing and defrosting the egg-whites;
  optionally force-filtering the thermally coagulated egg-whites;
  pureeing the thusly treated egg-whites; and
  adding a grain preserving agent;
    with the requirement that the composition is enriched in solids and attains a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

Further, it pertains to a method of making a simulated egg-yolk composition comprising the steps of:
  adding a colorant to natural egg-whites;
  adding egg-albumin to raise the solids of the egg-whites preferably to 17–23% by weight;
  coagulating the egg-whites by thermal means;
  adding a grain preserving agent; and
  pureeing the coagulated egg-whites and the grain preserving agent;
    with the requirement that the composition is enriched in solids and attains a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

This invention, also pertains to a method of making a shaped simulated egg-yolk comprising the steps of:
  making a composition by
    adding a colorant to egg-whites, the egg-whites being selected from the group consisting of natural egg-white and natural egg-white containing additional albumin;
    coagulating the egg-whites thermally;
    optionally freezing and defrosting the egg-whites;
    optionally force-filtering the thermally coagulated egg-whites; and
    adding a grain preserving agent; and
    pureeing the coagulated egg-whites and said grain preserving agent;
      with the requirement that the composition is enriched in solids and attains a consistency resembling that of real pureed hard-boiled egg-yolk, for a period of time of more than 10% longer in the presence of the grain preserving agent than in the absence of said grain preserving agent when the egg composition is maintained at substantially 45° F.; and
  forming the composition into said shaped simulated egg-yolk.

The present invention further pertains to a method of making a simulated egg product comprising the steps of:
  forming a shaped simulated egg-yolk, the yolk having a composition comprising
    (a) a colorant,
    (b) pureed thermally-coagulated egg-white, and
    (c) a grain preserving agent;
      with the requirement that the composition is enriched in solids and has a consistency resembling that of real pureed hard-boiled egg-yolk, for a period of time of more than 10% longer in the presence of the grain preserving agent than in the absence of said grain preserving agent when the egg composition is maintained at substantially 45° F.; and
  combining the shaped simulated egg-yolk with a separate phase of egg-white, the egg-white selected from the group consisting of raw egg-white, and cooked egg-white.

The present invention is also directed to assemblies of containers and at least one of the following enclosed in the container:
  a simulated egg composition as described above;
  a shaped simulated egg-yolk as described above; and
  an egg-product comprising a shaped egg-yolk as described above, combined in a separate phase with raw or cooked egg-white.

The instant invention also pertains to food products containing the above described simulated egg-yolk composition.

The grain preserving agent in the simulated egg-yolk composition is preferably a second pureed composition comprising coagulated milk-solids, preferably of the non-fat type. The coagulated milk solids are insoluble in water, and they are produced by fermentation enzymes. However, they may also be produced by acid precipitation with optional thermal treatment. The coagulated milk-solids are preferably in the range of 30–40% by weight of total grain preserving agent, and 20–40% by weight of total solids in the egg-yolk composition. The preferable range of the grain preserving agent in the simulated yolk composition is 1–70% by weight.

Regarding the colorant utilized in the simulated egg yolk composition, it should preferably be insensitive to pH, but since the presently readily available pH-insensitive colorants are water soluble and they migrate easily from the yolk to the white, in many occasions it is preferable to use oil soluble but emulsified colorants in water which do not migrate easily.

In the case of shaped simulated egg-yolks, it is preferable that their shape is selected from the group consisting of sphere, disk, cylinder, crumbs, slices, and dices.

In the case that the simulated egg yolk has the shape of a disk, it is preferable that the disk is surrounded by a restrictive barrier, which barrier is preferably a polymer selected from a group consisting of carrageenan, pectin, alginate, and a mixture thereof, the polymer having been set or crosslinker by a multivalent ion. It is preferable that the disk-shaped simulated yolks are immersed in a solution of the crosslinker and then immersed into the polymer solution, as explained in detail in my co-pending application Ser. No. 08/075,106 filed Jun. 11, 1993. The disk-shaped yolks may be combined with row-egg white, and then be packaged either in this form, or after the egg-white has also been cooked, preferably in the form of fried well-done eggs. The yolk and the white may also be combined and packaged as hard-boiled eggs.

The simulated yolk may also be in the form of a cylinder, with egg-white cooked around it, also having the shape of a cylinder, which preferably is sliced at a later stage.

The shape of the simulated egg-yolk may also have the form of crumbs and/or dices and mixed with egg-white, which is also in a form of crumbs and/or dices and mixtures thereof.

Solids enrichment is an important parameter of the present invention. By "solids enrichment", it is meant that the solids in the composition have been caused to increase. This increase may be caused either by evaporation of volatile components, such as water for example, by thermal means, by vacuum as in incomplete and controlled freeze drying, and the like. Also it may be achieved by incorporation of other solids, such as for example the ones produced by spray drying, complete evaporation, complete freeze drying, and the like. The solids may also be enriched by force-filtering. The meaning of the term "force-filtering" includes all and any type of filtering, which does not depend on just gravity, and includes but is not limited to conventional press-filtering, compressed air- or other gas-filtering, vacuum filtering, centrifugal filtering, and the like. Solids enrichment may also be achieved by gravity filtering with or without simultaneous evaporation. However, gravity evaporation usually is an extremely slow process, and force-filtering is preferred by far.

Thus, the term "enriched solids composition" or the term "the composition is enriched in solids" signify that the solids of at least one of its main components, which main components are coagulated egg-white and grain preserving agent, have been raised in a way that the composition, after being pureed, is capable of fulfilling its requirement to have a consistency resembling that of real pureed hard-boiled egg-yolk, for a period of time of more than 10% longer in the presence of the grain preserving agent than in the absence of said grain preserving agent when the egg composition is maintained at substantially 45° F. It should be noted that simple admixing of the two main components may be adequate in some occasions to fulfill the composition's aforementioned requirement.

DETAILED DESCRIPTION OF THE INVENTION

It has been discovered by the applicant that a simulated hard-cooked egg-yolk may be made to give an excellent resemblance to a real hard-boiled egg-yolk in both image and behavior including texture and mouthfeel, if a number of requirements set forth by the applicant are met.

The instant invention is thus directed to a simulated hard cooked egg-yolk composition, to shaped egg-yolks, to eggs comprising such egg-yolks, as well as to methods for making the same, by utilizing colored pureed egg-white, of preferably increased solids, along with a grain preserving agent, as described in detail hereinwith. The instant invention, also pertains to food products containing these simulated egg-yolks, such as for example egg-salad, deviled eggs, cakes, and the like.

As aforementioned, the real hard cooked, or hard-boiled egg yolk is distinguished by its very special mouthfeel, which could be roughly characterized as grainy, but which actually is not exactly grainy, or which could be roughly characterized as pasty, and which actually is not exactly pasty. This special mouthfeel might be better perceived as one giving an initial soft-grain sensation to the mouth which gradually ends to a pasty impression. The real hard-cooked yolk is additionally characterized by its special structure, which is easy to crumble into pieces with a small pressure, and which at the same time allows easy reshaping, also by the application of a small pressure.

It has now been discovered by the applicant that pureed, cooked, colored, egg-white of increased albumin solids has the properties required to simulate a real hard-boiled egg-yolk. However, this is so only for a few hours following pureeing of the cooked egg-white, especially at refrigeration temperatures between 35° and 55° F. The pureed egg-white, immediately after being pureed has indeed the characteristic mouthfeel and the crumbling behavior of real hard boiled egg-yolk. Not only it gives the grainy/pasty/crumbly behavior, but also the taste and smell of the real hard-boiled egg-yolk. Nevertheless, a spontaneous process of re-agglomeration of the finely chopped egg-white particles progresses with time, especially at refrigeration temperatures required for preservation, and within a few hours, it becomes noticeable that the pureed egg-white starts reassuming a rubbery structure, which detracts from the characteristics of the real hard-boiled egg-yolk. Thus, the simulated yolk becomes of rather poor quality as a replacement of real egg-yolk within 24 hours at refrigeration temperatures of 35°–55° F.

Applicant found that a number of additives have the property to delay the reassumption of the rubbery consistency if incorporated into the egg-white in a sufficient amount, before or after the egg-white has been pureed. Since these additives preserve the soft grain-like character of the simulated yolk, they have been named "grain preserving agents". A simple method for determining whether a material is a grain preserving agent falling under the is described at a later section of this discussion.

According to one embodiment of the present invention, egg-white, preferably natural, is thermally coagulated, preferably after it has been mixed with a yellow colorant. Although the colorant may be added at a later stage, higher color uniformity is received when said colorant is added before the coagulation of the egg-white, and mixed well with said egg-white. This is especially so if the colorant is just water dispersible with the help of a surfactant, and not intrinsically water-soluble. The thermal coagulation of the egg-white may be achieved with any conventional method used to prepare cooked egg-whites. The coagulation container holding the egg-white may be heated directly by an electric element or flame. However, it is preferable that it is heated indirectly with steam, hot water, or the like in order to avoid overcooking. After the egg-whites have been fully coagulated, they are preferably chopped into pieces having preferably a size smaller than 1/16" and pressure-filtered to remove any excessive free water. Preferably, after the removal of the excessive water, the amount of solids remaining in the thusly treated egg-white are in the vicinity of 20%. The egg-whites are in turn pureed with a conventional high speed chopper or food processor/chopper until they attain the consistency of real egg-yolk. Depending on the food processor/chopper, the pureeing process may take a short or a long time. With most high speed food processors intended for home use, the pureeing step takes usually anywhere from 1 to 5 minutes. The end-point of pureeing is not difficult to recognize and achieve, since after the pureed white has attained the real egg-yolk consistency, additional pureeing does not change the particle size drastically. At the beginning of the pureeing step, the rate of particle size reduction is very fast, and slows down considerably as the particles become smaller and smaller. When the particles have become small enough to provide the composition with the consistency of real egg-yolk, the rate of reduction has become slow enough to make the end-point extremely broad, and therefore very easily detectable and attainable.

The solids of the egg-white may also be increased by addition of egg-albumin, such as spray-dried egg-white, for example. It should be pointed out, however, that different materials exhibit different water retention properties, and therefore, even with addition of excess solids, press-filtering may be still needed to receive the appropriate consistency.

If for any reason, the pureed composition resembles that of a real egg-yolk which has been diluted with water, further press filtering is required, and carried out. On the other hand, if the composition seems to be too dry, a liquid ingredient may be added to correct this deficiency. This liquid may be water, oil, and the like, and it may be added by itself, or as a component of the grain preserving agent, which is necessary as a vital additive in the composition to prolong the life of its real-egg-yolk-like consistency.

One of the most effective and preferable grain preserving agents is one containing pureed water-insoluble matter received by fermentation of milk with cheese enzymes, such as for example Rennet salts, and the like. Preferably, the matter used has not developed strong cheese smell and taste. For example, chunks of cottage cheese, after being rinsed with water, press-filtered and pureed, present an outstanding grain preserving agent in an amount corresponding to 20-40% coagulated milk solids based on total solids in the final simulated egg-yolk composition by weight.

A different grain preserving agent can be made by coagulating milk, preferably of the non-fat type, with an acid, such as for example, citric, fumaric, and the like, or with salts. In order to speed the process, heat may be applied. Continuous, good fast stirring is important, especially in the case where heat is applied, in order to ensure small enough particle formation and avoid premature hard agglomeration. Rinsing may be required before use to remove any sour taste which may be imparted by the acid.

An other example of useful grain preserving agents is that of powdered proteins, such as for example soy proteins. "Tofu", a soy-protein product (made by Nasoya Foods, Inc., Lominster, Mass. 01453) sold in supermarkets, may be used for this application.

Other grain preserving agents may have the form of oils, surfactants, starches, gums, gelatins, including hydrolyzed ones, collagen, including hydrolyzed collagen, or other materials.

As aforementioned, the mechanism by which the grain preserving agents act, and by which this delay is created is not clear. Therefore, applicant devised a method by which a person of ordinary skill in the art can determine whether a material at the amount added is a grain preserving agent falling within the scope of this invention. The procedure is as follows:

2.5 grams of 1% water dispersible beta-carotene are mixed in 500 grams of fresh egg-white. The mixture is homogenized for about 15–20 seconds in a conventional high speed mixer in order to produce a uniform liquid, which in turn is fully coagulated under continuous stirring over a boiling water bath. The coagulated mixture is then cooled, chopped to a puree consistency in a conventional high speed food mixer for about 1½ minutes, and press-filtered to a solids content of 20%±1% by weight.

The material under examination is added to 100 grams of the pureed press filtered egg-white, in a desirable quantity for examination, and the mixture is re-pureed. The mixture is then hand-formed into balls having a diameter of about 1", and placed in a refrigerator at substantially 45° F. (45° F.±3° F.).

2½ hours later (10% of 25 hours), similar control balls are put in the same refrigerator. The control balls are made from the pureed press-filtered egg-white which is re-pureed just before the control balls are made and put in the refrigerator.

25 hours after the samples under examination have been placed in the refrigerator, they are removed from the refrigerator along with the control samples, and they are examined and compared with each other for agglomeration of the particles, which agglomeration manifests itself as making the balls more rubbery and less crumbly. This behavior can be felt easily by putting hand-pressure on the balls and observing how they collapse, but also by the mouthfeel which can easily detect and discriminate rubbery versus yolk-like consistency. If the balls containing the material are less rubbery than the control balls as described above, then the material under examination in the amount added is considered to be a grain preserving agent falling under the scope of the instant invention.

The determination of solids can be made at 240° F. for 2 hours, or any other solids-determination-method, well known to the art. The sample has to be well distributed within the sample dish and be as thin as possible for complete evaporation of the contained water. Constant weight should be achieved when the sample is redistributed on the dish.

Although according to this invention, more preferable grain preserving agents are the ones which improve the longevity of the useful, less rubbery life of the simulated hard-cooked egg-yolk by at least 50%, even more preferably by at least 100%, and even more preferably manyfold, the 10% limit is applied because applicant believes that this is the point at which a person of ordinary skill in the art can make an unambiguous distinction of differences in improving the yolk longevity with regard to rate of particle agglomeration toward rubbery character.

When the grain preserving agent and the rest of the desired components, described hereinbelow, are added in the final composition, it is preferable that the composition is pureed again to ensure uniform mixing and distribution of the components, as well as particle reduction in case some agglomeration has occurred before the mixing. It is interesting to note that not only the pureed egg-white starts agglomerating soon after it has been pureed in the absence of the grain preserving agent, but some times the grain preserving agent itself may start agglomerating in the absence of the pureed egg-white. In such occasions, only the well mixed combination of the egg-white and grain preserving agent in the pureed state possess the required criteria to fall within the realm of this invention. Therefore, the pureeing step may be combined for all ingredients at the point after all these ingredients have been mixed and possibly force-filtered in the appropriate quantities.

Also, the force-filtering step may be combined for a mixture of different ingredients, after optional chopping to a desired degree of particle size distribution. Even the force-filtering step itself may become unnecessary, when the solids of the different ingredients are otherwise increased, which is solids enrichment. For example, the solids of the egg-white may be increased or enriched before the coagulation step by incorporating additional egg-albumin or other ingredients into the egg-white. The solids may also be enriched by thermal evaporation of water, or any other techniques, such as for example freeze drying to the desired degree, and the like.

Further, there are occasions in which it is preferable to add the grain preserving agent in the egg-white before the egg-white is coagulated. In those occasions, one has to ensure that the coagulation step does not destroy the properties of the grain preserving agent, or in general, desirable properties of the final composition. Also, in those occasions, the test method for determining whether the material grain preserving agent under test is actually a grain preserving agent falling within the limits of this invention, has to be slightly modified. In this particular case two compositions are made; one with and one without the material under test, but both with egg-white as already described in the previously described method. The composition with the material under test, after a chopping and press-filtering step is pureed and placed immediately in the refrigerator. In 2½ hours, the composition without the material under test, after having been subjected to a parallel treatment, is also placed in the same refrigerator, immediately after having been pureed. The rest of the test is the same as the one previously described.

With little experimentation, a person of ordinary skill in the art may easily determine the degree of filter-pressing, pureeing, as well as the amounts of ingredients in a desired formula for producing a desirable version of a simulated hard-cooked egg according to the present invention.

As aforementioned, refrigeration temperatures, according to the present inventions are the temperatures in the range of 35°–55° F. (approx. 2°–13° C.). Room temperature is a temperature of about 68°–77° F. (20°–25° C.), while cooking temperatures are the temperatures over the temperature at which the egg coagulates. The egg-white may start coagulating in the vicinity of about 139°–140° F. (about 60° C.), depending on its exact composition. Serving temperatures range between cooking and room temperatures.

A step of freezing the composition before force-filtering and/or pureeing is many times beneficial, since additional water may be removed by syneresis, and make the finally pureed composition less susceptible to low temperatures.

The simulated egg-yolk composition may be used in any application in which a real egg-yolk (cooked or uncooked) is used as a total or partial replacement, depending on the desired properties needed in the particular application. In many occasions it may be used in bulk, for example for cakes, cookies and the like, where the shape of the yolk is immaterial.

The simulated hard-cooked egg-yolk of this invention may also be made to have a shape, preferably selected from the group consisting of sphere, disk, cylinder, crumbs, slices, and dices, and its color is yellow. However, it may also take the form of a novelty item as far as the shape, color, or taste of the yolk are concerned.

Conventional methods of shape-formation may be used. For example, the yolks may be pressed in forms and then released to obtain the shape desired, for example half-spheres, which may be repressed in couples to form full spheres. Otherwise, they may be extruded and then cut, for example, into cylinders, disks or thinner slices. Other methods may also be used to achieve a given desired shape.

In the case that the yolk composition is shaped into disks, to serve for example in combination with cooked or uncooked egg-white for fried eggs, the ratio of the diameter to the thickness should preferably be larger than 1, more preferably 2–6, and even more preferably 3–4. If the ratio is less than 1, the disk may be considered to be a cylinder rather than a disc, and when cooked it is very likely that it will fall on its side. The diameter of the disc should preferably be 20–70 mm, more preferably 25–55 mm, and even more preferably 30–45 mm. A diameter smaller than 20 mm provides an unrealistically small looking yolk, while a diameter larger than 70 mm renders the egg-yolk unrealistically large-looking. The thickness should preferably be 4–20 mm, more preferably 5–15 mm, and even more preferably 10–15 mm. Yolks thinner than 4 mm look unrealistically small, while thicker than 20 mm are more difficult to warm adequately.

A restrictive barrier, for example in the form of a skin, a membrane, a coating, or the like around the egg-yolk, may be desirable in many occasions, especially when the solid yolk is used in combination with liquid egg-white. An example of a restrictive barrier may be a cross-linked film of an edible resin, such as for example an alginate, a pectin, and the like. A multivalent cation, such as for example calcium or aluminum may be used as the cross-linking agent in the form of a salt. The cross-linked film should be preferably strong, continuous, elastic, and thin in order to perform satisfactorily, both structurally and from the consumption point of view. The restrictive barrier in addition tom the above mentioned advantages, causes sharp edges of the yolk to become substantially rounded and natural-looking. For example, disks made by cutting a cylindrical form of the yolk have rather sharp edges. Very unexpectedly, a restrictive barrier as the above, causes the edges to assume a rounded configuration.

The discs, with or without the restrictive barrier, may be added to liquid white to constitute a whole egg, which may either be cooked immediately or it may be packaged and stored, preferably in the refrigerator so that it may be cooked at later time. After the whole egg has been cooked, in the form of a fried egg, for example, it may be consumed immediately, or it may also be packaged, stored, and consumed at a later time.

If the yolk has the form of a cylinder, egg-white may be dispensed around the yolk and cooked, in a manner that there is an outside cylinder of white, enclosing a concentric cylinder of yolk. This configuration may be consumed immediately, or it may be packaged and stored for later consumption. It may also be cut into slices and consumed immediately in the sliced form, or the slices may be packaged and stored for later consumption. Of course, the composite cylinder may be cut into other shapes, such as dices or crumbs, for example. These, may also be consumed or used immediately, or they may be packaged and stored for later consumption or other use. Such uses include, but they are not limited to incorporation of the crumbs or dices to salads, such as egg salads or other types of salads, for example.

It should be stressed that the simulated egg-yolk compositions, the simulated shaped egg-yolks, the simulated whole eggs, and the food products containing one or more of these simulated entities may be made, packaged, stored, and consumed in any combination that a producer or a consumer may desire as a matter of preference.

The colorant used in the simulated egg-yolk composition, is necessary in order to make the simulated egg-yolk resemble a real one, and in general, when it has any color at all except white, to make the yolk visibly distinguishable from the egg-white. Thus, it may have a yellow color, or any other color for special effects. Thus, use of a colorant is important in the practice of this invention so that there is a distinct visible difference between the egg-yolk and the egg-white combined with the egg-yolk. The colorant may be natural or artificial, hydrophilic or hydrophobic, water or oil soluble, or a combination thereof. As aforementioned, water soluble colorants may present a problem of exudation from the yolk to the white, which exudation, if excessive, may be objectionable. Of course, the degree of exudation is time dependent, and also dependent on whether the white is liquid or solid. Thus, if the time the egg-yolk stays in contact with liquid egg-white is limited, or if the white is solid, the problem is non-existent. Examples of water soluble colorants are the FD&C yellow #6, red #40 (water solutions containing propylene glycol, FD&C Yellow #5, FD&C red #40, and 0.1% propylparaben, sold in supermarkets as "Yellow Food Color", from McCormick & Co., Inc., P.O. Box 208, Hunt Valley, Md. 21030), as well as blue, and green, among others.

Water based colorants should not be used when the yolk and liquid white are to be together for extended periods of time, especially in the absence of restrictive barriers, as discussed hereinbelow. The reason why they are preferable if they may be used, is that they give a brighter and clearer color, they are directly soluble in the system and they do not need emulsification, as well as they are considerably more stable regarding both UV radiation and pH.

When the exudation of water-soluble colorants becomes a problem, oil soluble colorants are of preference, since when emulsified in the egg-yolk composition, no exudation occurs for all practical purposes. It seems that the considerably bigger oil-in-water droplets, having a much lower rate of diffusion than the intimately dissolved colorants, do not exudate in appreciable amounts within the time periods involved in this application, when the yolk is in contact with liquid egg-white.

Examples of oil soluble colorants are different carotenoids, such as beta-carotene for example, provided in a solid water dispersible form (1% beta carotene, #65659-0001 from Roche, Inc., Nutley, N.J., 07110), annatto, as well as Turmeric colorants. They are sensitive to UV light and to pH, and therefore, when used, appropriate precautions should be taken. Colorants different than those having a color similar to that of an egg-yolk may be used for special effects, to make for example "novelty" eggs having green yolks or Saint Patrick's day, or eggs with multicolored yolks and/or flavors for children, and the like. Other special effects may be achieved by using other shapes than discs. Examples are heart-like shapes, butterfly-like shapes, face-profile shapes, and any other type of preferably flat shapes. Of course, these may be combined with different colors to enhance the effect, if so desired. A good example may be that of an egg according to this invention, with a heart-shaped cholesterol-free yolk to symbolize the advantage of the simulated egg in saving the heart of the person who consumes such an egg. The amount of colorant in the composition depends on the strength of the particular colorant, as well as on the desired strength of the color in the final product.

Any type of egg-white, whether natural or simulated may be used in combination with the simulated yolk of this invention. Use of whey protein, preferably of the "ultrafiltration" type may be made to replace partially or totally the albumin of the egg-white, but it may also be added in the composition of the simulated egg-yolk of this invention. The egg-white to be used in making of the simulated yolk is preferably, however, natural egg-white in order to provide its natural egg-flavor to the yolk. Even though the preferable egg-yolks of this invention contain low or no cholesterol, and contain no or low fat, the cholesterol and fat content does not present limits to this invention. It is within the scope of this invention to include compositions which also contain real hard cooked egg-yolk. If the amount of the real egg-yolk is adequate, it may also serve as grain preserving agents. However, in other preferred embodiments of this invention, the amount of calories provided by the yolk is minimal.

Although additional flavor is not necessary for the practice of this invention, a number of egg-flavors are available in the market which resemble more or less the flavor and taste of the egg-yolk, and they may be used if so desired. The flavor of the egg-white, used in making the simulated yolk of this invention, is adequate to give the impression to a person eating a simulated egg, that the egg is a real one. Flavor enhancers may also be used, such as for example monosodium or monopotassium glutamate, disodium or dipotassium inosinate, disodium or dipotassium guanylate, and the like, as well as mixtures thereof.

Oils, preferably unsaturated vegetable oils, may be used to complement the composition of the egg yolk, if so desired. Examples of oils are cottonseed, safflower, corn, soybean, peanut, sunflower, olive, sesame, rape seed, and the like. The oils may also be used to dissolve oil-soluble colorants. Evidently, partially or fully hydrogenated oils or fats of synthetic or natural origin may also be used, but they are undesirable from the health point of view.

Emulsifiers may be also used for emulsifying the oils or for any other purposes. Lecithin is of particular interest and it may also be used as a nutritional supplement, to reduce stickiness, as well as to act as an emulsifier. Other common food grade emulsifiers, such as for example polyoxy alkylene mono and diglycerides, sorbitan monostearate, dioctyl sodium sulfosuccinate, polyoxyethylene sorbitan fatty acid esters, and the like may be used. The amount of emulsifier may vary from about 0.1% to about 10% based on the total composition of the yolk, preferably between 0.2% to 3%, and even more preferably between 0.5% to 1.5%. The presence of emulsifiers is of particular interest when the simulated yolk compositions of the instant invention are used as ingredients to food products which depend on the emulsification properties of the yolk. Such products are for example, cakes, mayonnaise, certain salad dressings, and the like.

Miscellaneous other ingredients, such as vitamins, minerals, stabilizers, antioxidants, opacifiers, preservers, and the like, well recognized and utilized in the art of food products may also be used to impart the respective desirable functions. These may for example include such compounds as aluminum sulfate, ferric orthophosphate, thiamine mononitrate, riboflavin, vitamin D2, and the like.

Pasteurization of the simulated egg white part of the instant invention should be conducted to meet Government specifications regarding microbe content. Salmonella bacteria are of great concern. Pasteurization techniques are given in the "Encyclopedia Of Chemical Technology", Kirk Othmer, John Wiley & Sons, Vol. 8, pp. 429–445, the text of which is incorporated herein by reference. Since the simulated egg-yolks are being necessarily pasteurized during their manufacture, no additional pasteurization is necessary.

It should be noted that a person of ordinary skill in the art may vary the parameters and ingredients provided by this invention and receive the desired results without undue experimentation. A good reference for locating Suppliers regarding food ingredients to be used in the formulation of the simulated yolks of this invention, is Chilton's "Food Engineering Master", published by Chilton Co., 1330 Avenue of the Americas, New York, N.Y. 10019. It is evident that all materials used for the compositions of the present invention must be of food-grade, and that good manufacturing practices should be employed. One precaution that one has always to observe is that the results of incorporating a number of desired ingredients are not absolutely additive, and addition of one ingredient may change certain characteristics of another ingredient in an unexpected manner. This is more pronounced with proprietary ingredients which may happen to contain materials with antagonistic properties, and which the formulator is unaware of.

The non-flowability of the yolk of this invention provides the convenience to a cook to be able to have the egg-white in bulk packaging, accompanied by individual separate packages of egg-yolks, which will produce "well-done" yolks regardless of the time that the white has been cooked. This is especially desirable for mass cooking establishments, such as restaurants, hospitals, and the like. The fact that there is no need to watch the cooking time of the yolks, and that turning the eggs over is not needed or desired to achieve the "well-done" appearance, is also very helpful.

It should be noted that the yolk compositions of this invention, with or without the grain preserving agent, may also be incorporated in the formulation of the simulated yolks described in the parent cases (application Ser. No. 08/075,106 filed Jun. 11, 1993, and U.S. Pat. Nos. 5,227,189, 5,151,793, and 5,073,399) of this Application, in order to make yolks of the "medium" type when heated, in the form of an egg for example. The "medium" type yolks are between the "sunny-side-up" and "well-done" or "hard-cooked" types, in terms of viscosity. The pureed egg-white, in the above mixtures of the "medium" type, gives the simulated yolk, when heated, considerably fuller body and flavor, without the rubbery mouthfeel that one would get if uncooked egg-white had been incorporated in place of the coagulated and pureed one.

The following Examples are given for illustration purposes only, and should not be construed as limiting the scope of the present invention.

EXAMPLE 1

The following mixtures were made:

1.A 500 grams of natural egg-white from fresh eggs were homogenized for a few seconds with a high-speed mixer, and mixed with 2.5 grams of 1% beta-carotene water-dispersible powder (from Roche, Inc., Nutley, N.J., 07110). The mixture was then placed in a pot over a steam bath, and was cooked under stirring until it solidified completely into big chunks. The solidified mixture was then placed in a filter-cloth, which in turn was manually twisted in a manner to press-filter the mixture to a point that substantially no more liquid was removable through manual effort to twist further the cloth. The yield at this point was about 300 grams of wet material, which was chopped for a few seconds in a high speed food processor/chopper until the particles were predominately about 1/16" or smaller, and press-filtered again with the help of a cloth in the same manner. Some more liquid was removed, and the solids were determined and found to be 20% by weight. This determination was performed by placing 10 grams of the twice press-filtered material in an air oven at 240° F. for 2 hours, and weighing the remaining solids. This material, containing 20% solids, was then pureed in a high speed food processor/chopper until no appreciable size reduction of particles was being made, judging from mouthfeel and appearance. This material resembled real hard-boiled egg-yolk in all respects, including mouthfeel, taste, appearance, and crumbling characteristics when pressed between fingers.

1.B

A package of "Light and Lively", non-fat, cottage cheese was water rinsed to remove the free liquids portion containing any suspended solids, and strained for about 5 minutes. 375 grams of the strained material were press-filtered as above, with a yield of about 195 grams, which were mixed with 1 gram of 1% water dispersible beta-carotene powder, and pureed in a high speed food processor/chopper until no appreciable size reduction of particles was being made, judging from mouthfeel and appearance. This material resembled real hard-boiled egg-yolk in all respects, including mouthfeel, appearance, and crumbling characteristics when pressed between fingers, except for the taste which was rather blunt.

The following composition were then made:

| | COMPOSITION: 1- | | | | | |
|---|---|---|---|---|---|---|
| INGREDIENT | 1 | 2 | 3 | 4 | 5 | 6 |
| 1.A | 40 | 39.6 | 39.2 | 38 | 36 | 32 |
| 1.B | — | 0.4 | 0.8 | 2 | 4 | 8 |

Each of the above compositions was re-pureed for 1½ min. in a high speed food processor/chopper and shaped into two spherical yolks. They all behaved like real yolks in all respects. They were then put in the refrigerator, and re-examined after 25 hours. Compositions 1-1 to 1-4 were very rubbery indicating excessive agglomeration of particles, while composition 1-10 was less rubbery, and composition 1-6 remained substantially intact.

EXAMPLE 2

A composition was made as in case 1-6 of Example 1 in larger quantity. As soon as it was pureed, it was introduced in a cookie extruder and shaped into the form of a cylinder, about 3" long and a diameter of about 1⅛". The simulated egg-yolk cylinder was supported at the center of a cylindrical vessel having a length of about 2⅞" and a diameter of about 1¾". Liquid natural egg-white was poured in the vessel around the cylindrical simulated yolk, and the vessel was heated in a steam bath until the egg-white was completely solidified. The combination of the cylindrical solid yolk surrounded by the egg-white, was allowed to cool to room temperature, and part of it was cut perpendicular to the cylinder's axis, with a wire, to slices having a thickness of about ⅛". These slices looked and behaved like slices of real hard-boiled eggs.

The above indicate that the conventional machines, very well known to the art, which make real-egg cylinders may be used for making the simulated-egg cylinders of this invention.

EXAMPLE 3

The part of the cylinder of Example 2, which had not been sliced then, was sliced in this experiment and then diced into small cube-like entities having an average side of ⅛" to ¼". The dices, which looked and behaved like dices of real hard boiled egg, were used on top of a tossed salad.

EXAMPLE 4

A composition was made as in case 1-6 of Example 1, divided into crumbs and mixed with twice its weight egg-white crumbs. A small amount of non-fat mayonnaise and mustard were added and mixed to produce a simulated egg-salad, which highly resembled real egg-salad.

EXAMPLE 5

A composition was made as in case 1-6 of Example 1, and thoroughly mixed with a small amount of non-fat mayonnaise, mustard and pepper, to form a thick paste.

The yolks were removed from a number of hard boiled eggs, which were cut in halves, leaving a cavity in each white-half.

The paste was used to stuff the cavities of the whites in order to form simulated devilled eggs highly resembling real deviled eggs.

EXAMPLE 6

A composition was made as in case 1-6 of Example 1 in larger quantity. As soon as it was pureed, it was introduced in a cookie extruder and shaped into the form of a cylinder, about 3" long and a diameter of about 1⅛". The simulated yolk cylinder was cut in disks having a thickness of about 3/16". One disk was placed in liquid egg-white, and the resulting simulated egg was fried on a release surface substantially free of fat. The simulated fried egg had high resemblance to a real fried egg, especially when it was turned over during frying.

EXAMPLE 7

A simulated yolk disk, made as in example 6, was dipped into a 4% by weight of calcium chloride in water, and then in 1% by weight of sodium alginate (Keltone HV, sold buy KELCO, Clark, N.J.) in water, to form a restrictive barrier around the disk. The coated simulated yolk was placed in liquid egg-white, and fried. The simulated fried egg had high resemblance to a real fried egg.

EXAMPLE 8

80 grams of a composition similar to 1-6 of Example 1 were thoroughly mixed with 20 grams of hard-boiled real egg-yolk. This mixture had similar physical characteristics as composition 1-6 of Example 1, but it was of improved flavor and taste. The mixed composition could be shaped into different forms and produce similar products as the ones described above.

EXAMPLE 9

20 grams of spray dried egg-white were dissolved in 200 grams of fresh natural egg-white, and 2 ml of yellow color (sold in supermarkets as "Yellow Food Color", from McCormick & Co., Inc., P.O. Box 208, Hunt Valley, Md. 21030) were added, and mixed thoroughly. The mixture was then coagulated completely over a steam bath, chopped to small pieces and press-filtered with a cloth as in case of Example 1.

60 grams of the press-filtered mixture was mixed with 30 grams of Extra-Firm Tofu (a soy-protein product sold in supermarkets and made by Nasoya Foods, Inc., Lominster, Mass. 01453) after the Tofu had been strained for a few minutes. This final mixture was pureed in a high speed food processor/chopper for 2 minutes, at which point no more appreciable particle size reduction seemed to be taking place.

The thusly made composition was used successfully to make products similar to the ones described in the above Examples.

What is claimed is:
1. A simulated egg-yolk composition, comprising
   (a) a colorant,
   (b) pureed thermally-coagulated solids-enriched egg-white, and

(c) a grain preserving agent; with the requirement that the composition has a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

2. The simulated egg-yolk composition of claim 1, wherein the grain preserving agent is a pureed composition comprising coagulated milk-solids.

3. The simulated egg-yolk composition of claim 2, wherein the milk is a non-fat milk.

4. The simulated egg-yolk composition of claim 2, wherein the coagulated milk solids have been produced by fermentation enzymes.

5. The simulated egg-yolk composition of claim 2, wherein the coagulated milk solids have been produced by acid precipitation under conditions selected from the group consisting of (a) not applying additional heat and (b) applying heat.

6. The simulated egg-yolk composition of claim 2, wherein the colorant is insensitive to pH.

7. The simulated egg-yolk composition of claim 2, wherein the coagulated milk-solids are in the range of 20–40% by weight of total solids in the egg-yolk composition.

8. A shaped egg-yolk having a composition comprising
 (a) a colorant,
 (b) pureed thermally-coagulated solids-enriched egg-white, and
 (c) a grain preserving agent; with the requirement that the composition has a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

9. The simulated egg-yolk of claim 8, wherein the grain preserving agent is a pureed composition comprising coagulated milk-solids.

10. The simulated egg-yolk of claim 9, wherein the milk is a non-fat milk.

11. The simulated egg-yolk of claim 9, wherein the coagulated milk solids have been produced by fermentation enzymes.

12. The simulated egg-yolk composition of claim 9, wherein the coagulated milk solids have been produced by acid precipitation under conditions selected from the group consisting of (a) not applying additional heat and (b) applying heat.

13. The simulated egg-yolk of claim 9, wherein the colorant is insensitive to pH.

14. The simulated egg-yolk of claim 9, wherein the coagulated milk-solids are in the range of 20–40% by weight of total solids in the egg-yolk composition.

15. The simulated egg-yolk of claim 8, wherein the shape of the yolk is substantially a disk.

16. The simulated egg-yolk of claim 15, further comprising a restrictive barrier surrounding said yolk.

17. The simulated egg-yolk of claim 16, wherein the restrictive barrier is a polymer selected from the group consisting of carrageenan, pectin, alginate, and a mixture thereof, the polymer having been set by a multivalent ion.

18. The simulated egg-yolk of claim 8, wherein the shape of the yolk is substantially in a form selected from the group consisting of sphere, cylinder, crumbs, slices, and dices.

19. A simulated egg product comprising:
 egg-white selected from the group consisting of raw egg-white, and cooked egg-white; a shaped simulated egg-yolk combined with the egg-white in a separate phase, the yolk having a composition comprising
 (a) a colorant,
 (b) pureed thermally-coagulated egg-white, and
 (c) a grain preserving agent;
 with the requirement that the composition is enriched in solids and has a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

20. The simulated egg product of claim 19, wherein the shape of the yolk has a form of a disk.

21. The simulated egg product of claim 20, wherein the disk further comprises a restrictive barrier surrounding said disk.

22. The simulated egg product of claim 21, wherein the restrictive barrier is a polymer selected from the group consisting of carrageenan, pectin, alginate, and a mixture thereof, the polymer having been set by a multivalent ion.

23. The simulated egg product of claim 19, wherein the shape of the yolk has a form of a cylinder.

24. The simulated egg product of claim 23, wherein the egg-white, which the yolk is combined with, is cooked and also has the shape of a cylinder surrounding the cylindrical yolk.

25. The simulated egg product of claim 24, wherein the cylindrical egg product has been cut into slices.

26. A method of making a simulated egg-yolk composition comprising the steps of:
 adding a colorant to egg-whites, the egg-whites selected from the group consisting of natural egg-white and natural egg-white containing additional albumin;
 coagulating the egg-whites thermally;
 force-filtering the thermally coagulated egg-whites;
 pureeing the thusly treated egg-whites; and
 adding a grain preserving agent;
 with the requirement that the composition is enriched in solids and attains a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

27. The method of claim 26, wherein the amount of the added grain preserving agent is in the range of 1–70%, based on the weight of solids contained in the composition.

28. A method as defined in claim 27, wherein the grain preserving agent comprises coagulated milk solids.

29. A method of making a simulated egg-yolk composition comprising the steps of:
 adding a colorant to natural egg-whites;

adding egg-albumin to raise the solids of the egg-whites;

coagulating the egg-whites by thermal means;

adding a grain preserving agent; and pureeing the coagulated egg-whites and the grain preserving agent;

with the requirement that the composition is enriched in solids and attains a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

30. The method of claim 29, wherein the addition of albumin raises the solids of the egg-whites to 17–23% by weight.

31. The method of claim 30, wherein the amount of added grain preserving agent is in the range of 1–70%, based on the weight of solids contained in the composition.

32. The method of claim 31, wherein the grain preserving agent comprises coagulated milk solids.

33. The method of claim 32, wherein the coagulated milk solids in the grain preserving agent are 30–40% by weight.

34. The method of claim 33, wherein the coagulated milk solids in the simulated egg composition are 20–40% by weight based on total solids.

35. The method of claim 29, wherein the step of adding the grain preserving agent precedes the step of pureeing the egg white.

36. A method of making a shaped simulated egg-yolk comprising the steps of:

making a composition by
adding a colorant to egg-whites, the egg-whites being selected from the group consisting of natural egg-white and natural egg-white containing additional albumin;
coagulating the egg-whites thermally;
force-filtering the thermally coagulated egg-whites;
adding a grain preserving agent; and
pureeing the coagulated egg-whites and said grain preserving agent;
with the requirement that the composition is enriched in solids and attains a consistency resembling that of real pureed hard-boiled egg-yolk, for a period of time of more than 10% longer in the presence of the grain preserving agent than in the absence of said grain preserving agent when the egg composition is maintained at substantially 45° F.; and
forming the composition into said shaped simulated egg-yolk.

37. The method of claim 36, wherein the shape of the yolk is substantially in a form selected from the group consisting of sphere, disk, cylinder, crumbs, slices, and dices.

38. The method of claim 36, wherein the shape of the yolk has a form of a disk surrounded by a restrictive barrier.

39. The method of claim 38, wherein the restrictive barrier is a polymer selected from a group consisting of carrageenan, pectin, alginate, and a mixture thereof, the polymer having been set by a multivalent ion.

40. A method of making a simulated egg product comprising the steps of:

forming a shaped simulated egg-yolk, the yolk having a composition comprising
(a) a colorant,
(b) pureed thermally-coagulated egg-white, and
(c) a grain preserving agent;
with the requirement that the composition is enriched in solids and has a consistency resembling that of real pureed hard-boiled egg-yolk, for a period of time of more than 10% longer in the presence of the grain preserving agent than in the absence of said grain preserving agent when the egg composition is maintained at substantially 45° F.; and
combining the shaped simulated egg-yolk with a separate phase of egg-white, the egg-white selected from the group consisting of raw egg-white, and cooked egg-white.

41. The method of claim 40, wherein the shape of the yolk is substantially in a form selected from the group consisting of sphere, disk, cylinder, crumbs, slices, and dices.

42. The method of claim 40, wherein the shape of the yolk has a form of a disk surrounded by a restrictive barrier.

43. The method of claim 42, wherein the restrictive barrier is a polymer selected from a group consisting of carrageenan, pectin, alginate, and a mixture thereof, the polymer having been set by multivalent ion.

44. The method of claim 40, wherein the shape of the yolk has a form of a cylinder, and the egg-white, which the yolk is combined with, is cooked and also has the shape of a cylinder surrounding the cylindrical yolk.

45. The method of claim 44, further comprising a step of cutting the cylindrical egg product into slices.

46. The method of claim 40, wherein the shape of the yolk has a form selected from the group consisting of crumbs, dices and mixtures thereof, and the egg-white, which the yolk is combined with, also has a form selected from the group consisting of crumbs, dices and mixtures thereof.

47. An assembly of a container and a simulated egg-yolk composition enclosed in said container, the simulated egg-yolk composition comprising
(a) a colorant,
(b) pureed thermally-coagulated egg-white, and
(c) a grain preserving agent; with the requirement that the composition is enriched in solids and has a consistency resembling that of real pureed hard-boiled egg-yolk, for a period of time of more than 10% longer in the presence of the grain preserving agent than in the absence of said grain preserving agent when the egg composition is maintained between 40° and 50° F.

48. An assembly of a container and a shaped simulated egg-yolk enclosed in said container, the simulated egg-yolk having a composition comprising
colorant,
(b) pureed thermally-coagulated egg-white, and
(c) a grain preserving agent;
with the requirement that the composition is enriched in solids and has a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

49. The assembly of claim 47, wherein the shape of the yolk is substantially in a form selected from the group consisting of sphere, disk, cylinder, crumbs, slices, and dices.

50. An assembly of a container and a simulated egg-product enclosed in said container, the simulated egg product comprising:
   egg-white selected from the group consisting of raw egg-white, and cooked egg-white;
   a shaped simulated egg-yolk combined with the egg-white in a separate phase, the yolk having a composition comprising
   (a) a colorant,
   (b) pureed thermally-coagulated egg-white, and
   (c) a grain preserving agent;
   with the requirement that the composition is enriched in solids and has a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

51. The assembly of claim 50, wherein the shape of the yolk is substantially in a form selected from the group consisting of sphere, disk, cylinder, crumbs, slices, and dices.

52. A food product comprising a simulated egg-yolk composition, which composition comprises
   (a) a colorant,
   (b) pureed thermally-coagulated solids-enriched egg-white, and
   (c) a grain preserving agent;
   with the requirement that the composition has a consistency resembling that of real pureed hard-boiled egg-yolk, for a period of time of more than 10% longer in the presence of the grain preserving agent than in the absence of said grain preserving agent when the egg composition is maintained at substantially 45° F. for 25 hours.

* * * * *